United States Patent

[11] 3,542,154

| [72] | Inventors | Bengt O. J. S. Morner<br>Olbergsgatan 6A;<br>Gunther Heinrich Wilhelm Dobbertin,<br>Ovre Olskroksgatan 28, Gothenburg O,<br>Sweden |
|---|---|---|
| [21] | Appl. No. | 715,676 |
| [22] | Filed | March 25, 1968 |
| [45] | Patented | Nov. 24, 1970 |
| [32] | Priority | March 28, 1967 |
| [33] | | Sweden |
| [31] | | No. 4195/1967 |

[54] LUBRICATING MEANS FOR ENGINE-DRIVEN CHAIN SAWS
1 Claim, 1 Drawing Fig.

[52] U.S. Cl. ................................................. 184/6,
143/32, 184/15, 123/196
[51] Int. Cl. ..................................................... F01m 1/08,
F16n 23/00
[50] Field of Search ........................................... 184/5, 15A,
15, B, 6K, 6N; 143/32, 32.1; 123/196

[56]   References Cited
UNITED STATES PATENTS

| 1,647,846 | 11/1927 | Vincent....................... | 184/6 |
| 2,746,555 | 5/1956 | Dalrymple et al. ........... | 184/15X |
| 2,754,814 | 7/1956 | Hopwood..................... | 184/6X |
| 2,852,046 | 9/1958 | Kiekhaefer................... | 143/32 |
| 2,936,748 | 5/1960 | Jensen.......................... | 184/6X |
| 3,448,829 | 6/1969 | Rauh et al..................... | 143/32X |

*Primary Examiner*—Manuel A. Antonakas
*Attorney*—Linton & Linton

ABSTRACT: In a portable engine driven chain saw the sprocket for driving the saw chain is rotatably supported by a bearing on the engine crankshaft and channels extend through said crankshaft in communication with the interior of the engine crankcase and said bearing for supplying a lubricant to the bearing while a plug with a restricted channel is positioned in said crankshaft channel to restrict the passage of gases from the crankcase through the crankshaft channel.

Patented Nov. 24, 1970
3,542,154
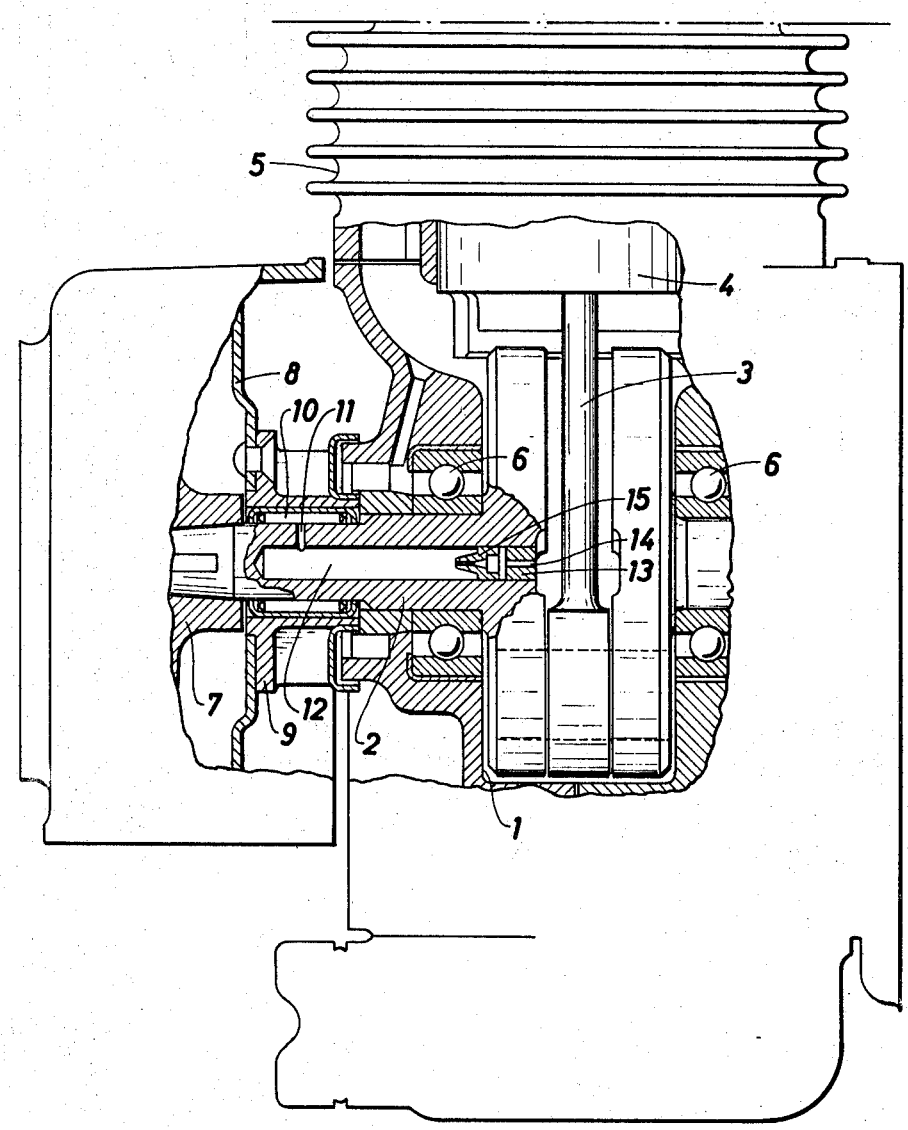
INVENTORS
BENGT OLOF JOHAN STELLAN MORNER
AND GUNTHER HEINRICH WILHELM DOBBERTIN
BY Linton and Linton
ATTORNEYS

LUBRICATING MEANS FOR ENGINE-DRIVEN CHAIN SAWS

The present invention relates to portable engine-driven chain saws wherein a drive sprocket for the saw chain is rotatably journaled on the crankshaft of the engine.

In a chain saw of the type referred to above, the rotatable chain driving sprocket journaled on the crankshaft is connected to the output member of a clutch, the input member of which is connected to the crankshaft. In previously known chain saws of this type, the bearing for the drive sprocket has been either "permanently lubricated" or adapted to be lubricated from the outside, which has necessitated removal of the clutch provided on the crankshaft end outside the chain drive sprocket. Bearings of the "permanently lubricated" type must also be exchanged, and this has also necessitated removal of the clutch causing labour costs and loss of time.

The present invention, which has for its object to overcome the above inconvenience by providing a bearing for the chain sprocket which does not need servicing, is characterized substantially in that for the purpose of supplying lubricating oil to the bearing, the latter communicates with the crankcase via a restricted channel provided in the crankshaft. Preferably, a check valve opening in a direction away from the crankcase may be provided in said channel.

The invention makes it possible to use a slide bearing for journaling the drive sprocket on the crankshaft. Slide bearings previously used for this purpose have proved to be too short-lived due to insufficient lubricating, and it has therefore been considered necessary to use the more expensive roller bearings.

The invention will be described more closely herebelow with reference to the accompanying drawing which shows, partly in cross section, a portion of a chain saw provided with means according to the invention.

In the drawing, numeral 1 indicates the crankcase formed in the engine housing, numeral 2 indicates the crankshaft, 3 is the crank rod, 4 is the engine piston, and numeral 5 indicates the engine cylinder. The crankshaft is journaled in the engine housing by means of roller bearings 6 and has attached to one end portion the input member 7 of a clutch. A sprocket 9 is connected to the output member 8 of the clutch for driving the saw chain not shown in the drawing. In the engaged position of the two clutch members 7 and 8 which are not shown in detail in the drawing, the chain sprocket 9 will thus rotate together with the shaft 2 whereas, when the clutch members are disengaged, the shaft will be idling relative to the sprocket. For this reason the chain sprocket is journaled on the shaft 2 by means of a needle bearing 10 or other suitable type of bearing.

The space between the chain driving sprocket 9 and the shaft 2 receiving the bearing 10 communicates via a radial bore 11 in the shaft with an axial channel 12 provided centrally in the shaft, said channel opening into the crankcase at the crank portion of the shaft. In that end of the channel 12 which opens into the crankcase there is provided, in the embodiment shown, a plug 13 through which extends a channel 14 with considerably smaller cross-sectional area than the channel 12 and forming a restricted passage for gases from the crankcase which gases together with lubricating oil are supplied to the bearing 10 via the channel 12 and the radial bore 11. In this manner an automatic lubrication of the bearing 10 is obtained during operation of the chain saw. It has been found that the restricted channel 14, in order to provide sufficient lubrication of the bearing 10 without causing any noticeable pressure losses in the crankcase, should have a diameter substantially not exceeding 0.5 millimeters.

In order to positively avoid leakage of air into the crankcase through the bearing 10, through the channels 11, 12 and 14, there may be provided in the channel 12, as in the embodiment shown, a lip valve 15 or other type of check valve opening in a direction away from the crankcase. Furthermore, lip seals may be provided at the ends of the bearing 10.

The invention is not limited to the embodiment described hereinbefore and as shown in the drawing, said embodiment being susceptible of modifications with respect to its details without departing from the scope of the preceding claims.

We claim:

1. In a portable engine driven chain saw having an engine crankcase, a crankshaft in said crankcase, a driving sprocket rotatably journaled on said crankshaft and capable of driving a saw chain, clutch means connected to said crankshaft and said driving sprocket for locking said driving sprocket for rotation together with said crankshaft, a bearing rotatably supporting said driving sprocket around said crankshaft, lubricating means for said bearing comprising a channel in said crankshaft opening into said crankcase, a bore in said crankshaft extending laterally of said crankshaft being in communication with said channel and said bearing, a plug positioned in and extending across a portion of said channel and said plug having a channel therethrough in communication with said crankcase at one end and with said bore by means of said first channel at its other end and having a diameter not exceeding 0.5 millimeter.